E. C. NORTHRUP.
BOX NAILING MACHINE.
APPLICATION FILED MAY 28, 1915.

1,226,907.

Patented May 22, 1917.
8 SHEETS—SHEET 2.

WITNESSES:
A. H. Kephart
Elbert R. Bremer

INVENTOR.
E. C. NORTHRUP.
BY
Carlos P. Griffin
ATTORNEY.

E. C. NORTHRUP.
BOX NAILING MACHINE.
APPLICATION FILED MAY 28, 1915.

1,226,907.

Patented May 22, 1917.
8 SHEETS—SHEET 4.

WITNESSES:

INVENTOR.
E.C. NORTHRUP.
BY
Carlos P. Griffin
ATTORNEY.

E. C. NORTHRUP.
BOX NAILING MACHINE.
APPLICATION FILED MAY 28, 1915.
1,226,907.
Patented May 22, 1917.
8 SHEETS—SHEET 6.
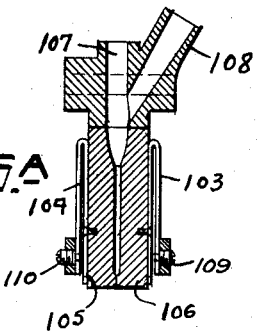
Fig. 5-A.
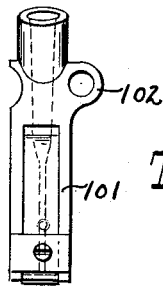
Fig. 5-B.
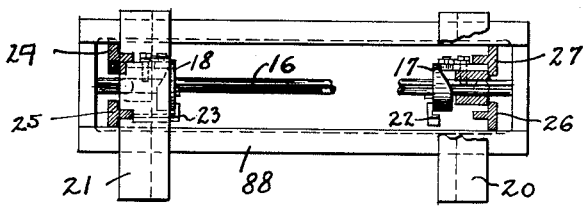
Fig. 6.
Fig. 7.
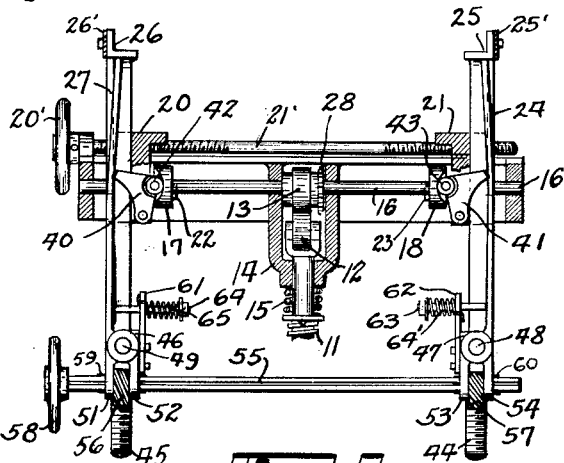
Fig. 8.
WITNESSES:
INVENTOR.
E. C. NORTHRUP.
BY
Carlos P. Griffin
ATTORNEY.

E. C. NORTHRUP.
BOX NAILING MACHINE.
APPLICATION FILED MAY 28, 1915.

1,226,907.

Patented May 22, 1917.
8 SHEETS—SHEET 7.

WITNESSES:

INVENTOR.
E. C. NORTHRUP.
BY
Carlos P. Griffin
ATTORNEY.

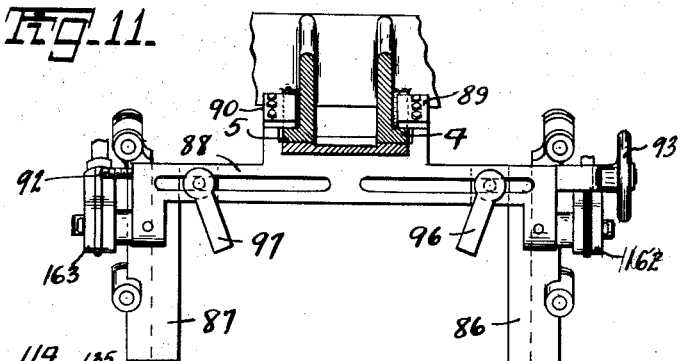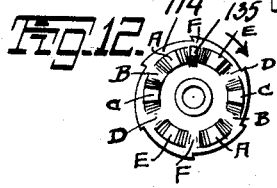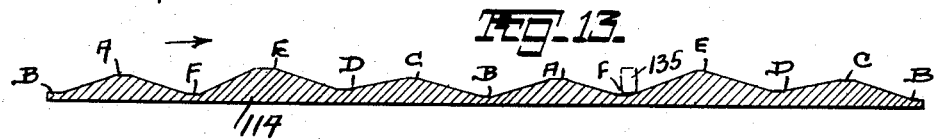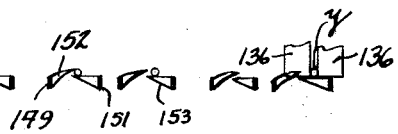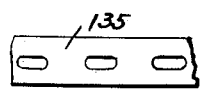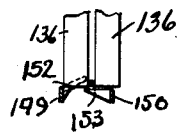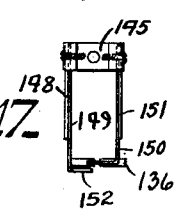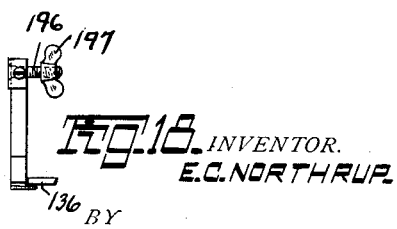

UNITED STATES PATENT OFFICE.

ELMER C. NORTHRUP, OF SAN FRANCISCO, CALIFORNIA, ASSIGNOR, BY MESNE ASSIGN-
MENTS, TO SAVINGS UNION BANK AND TRUST COMPANY, OF SAN FRANCISCO, CALI-
FORNIA, A CORPORATION OF CALIFORNIA.

BOX-NAILING MACHINE.

1,226,907.  Specification of Letters Patent.  Patented May 22, 1917.

Application filed May 28, 1915. Serial No. 30,982.

*To all whom it may concern:*

Be it known that I, ELMER C. NORTHRUP, a citizen of the United States, residing at San Francisco, in the county of San Francisco, State of California, have invented a new and useful Improvement in Box-Nailing Machines, of which the following is a specification, in such full and clear terms as will enable those skilled in the art to construct and use the same.

This invention relates to a box nailing machine and its object is to provide a machine which will be capable of considerable adjustment to take different sized boxes.

Another object of the invention is to provide a machine which is capable of nailing the two sides and bottom on the box ends in three successive operations, suitable support for the box ends being provided at the proper heights successively to effect the nailing.

Another object of the invention is to so position the nail chucks as to drive the nails slightly at an angle with the grain of the material of which the box ends are made, thereby avoiding splitting the box and making a stronger box.

Another object of the invention is to locate the rods for effecting the nailing as nearly as possible directly over the center of the several nail chucks thereby bringing the strain directly in line with the nailing punches and reducing the strain on the frame of the machine.

Another object of the invention is to provide means whereby the nailing machine will supply the proper number of nails and in the proper places to effect the nailing of the sides and bottom to the box ends, means also being provided for cutting any given series of nails out of operation thereby making it possible to economize on the number of nails used in the making of a box, it being unnecessary to feed down nails into each nail chuck each time the machine is operated.

It is to be observed that this machine works in three distinct cycles. The first cycle is the nailing on the end pieces which are placed in suitable holders with the first side pieces. Thereafter the box is turned 90 degrees and the bottom is nailed thereon, following which the box is turned 90 degrees more and the table which supports the box is lowered the thickness of the previous box side, whereupon the remaining side may be nailed to the box ends, it requiring only three nailing operations to complete the box.

Other objects of the invention will appear as the description proceeds.

An embodiment of the invention is shown in the drawing in which the same reference numeral is applied to the same portion throughout, and in which—

Figure 3:
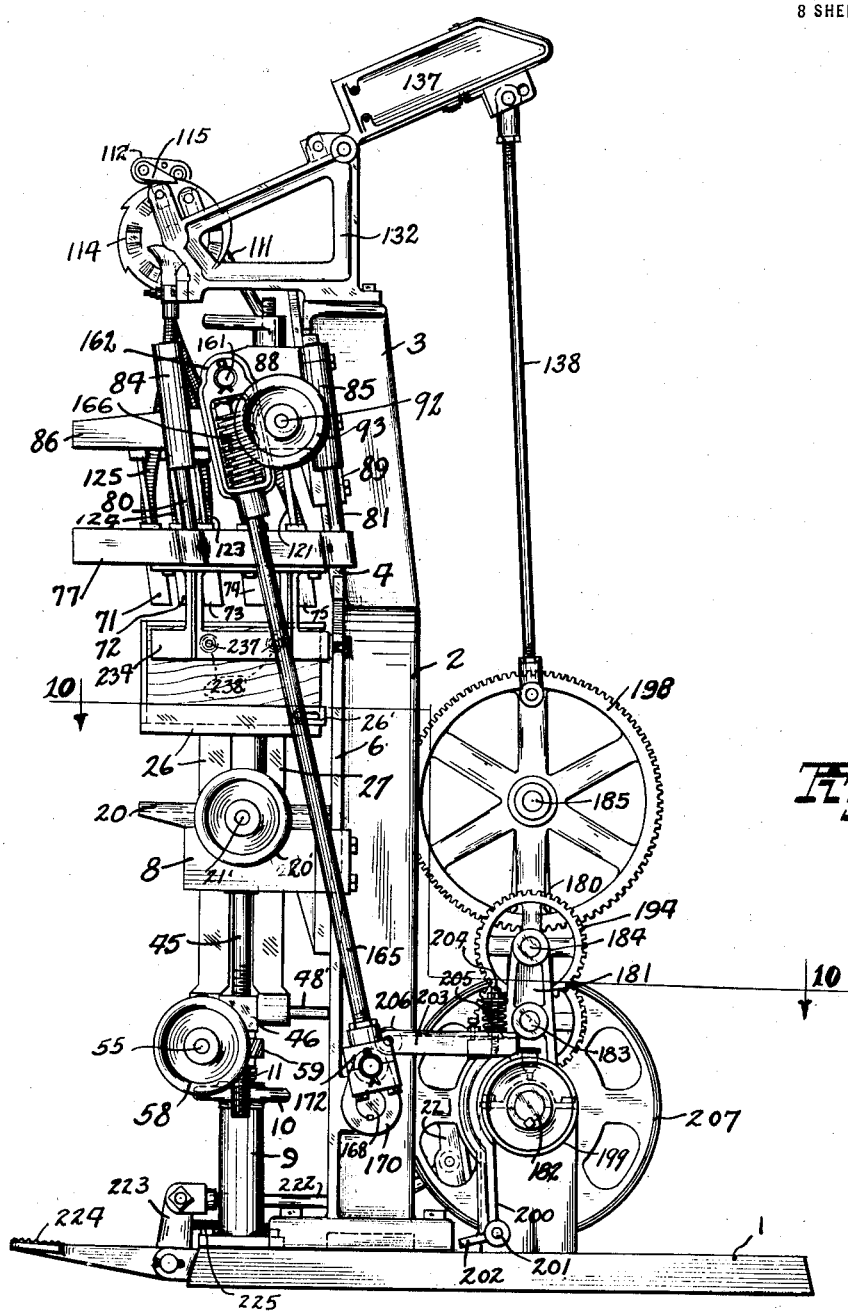
Fig. 3 is a side elevation of the machine looking from the right of Fig. 2.
Figure 4:
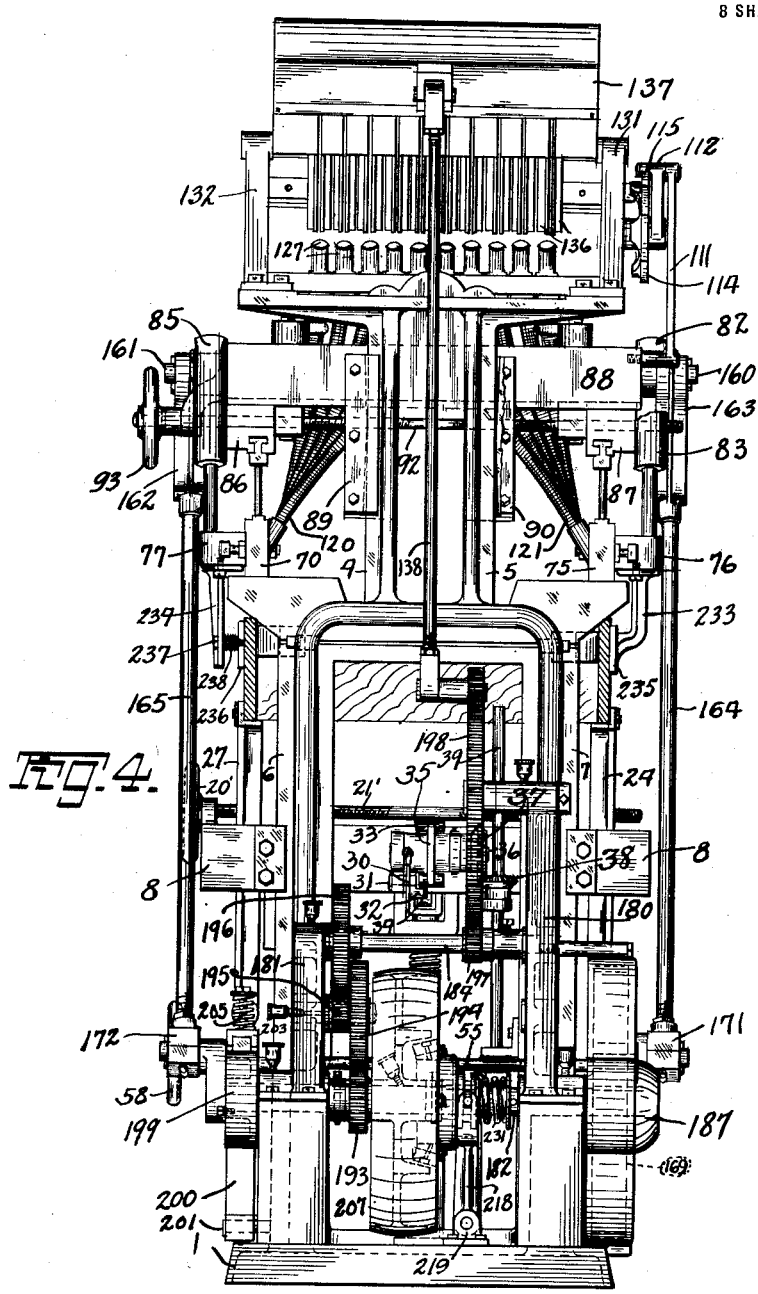
Fig. 4 is a back elevation of the machine.
Figure 9:
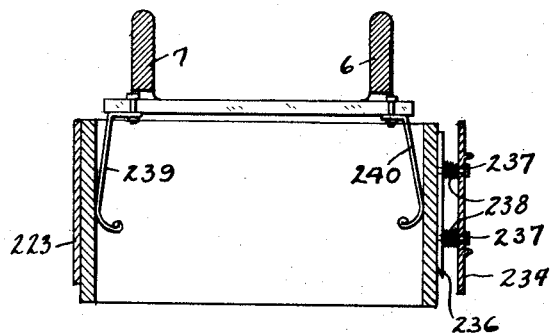
Figure 10:
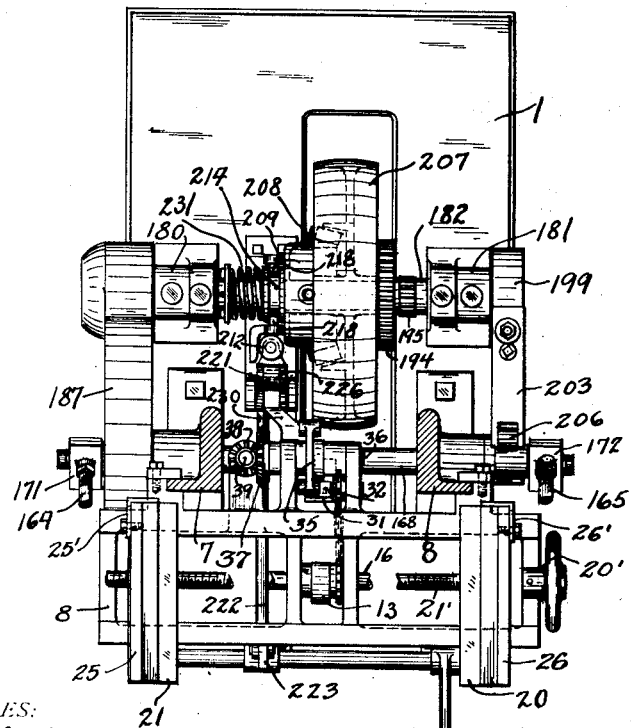

Fig. 6 is a plan view of the box supporting tables illustrating the means for releasing and engaging the members for holding the box ends when the bottom is to be nailed thereon, Fig. 7 is a perspective view of one of the cams used for shifting the box end supports, Fig. 8 is a view in elevation and partly in section of the box holding table, box holding arms and means for raising and lowering the box holding arms at will, Fig. 9 is a plan view partly in section of the form used for positioning the box ends prior to the placing of the side pieces thereon, Fig. 10 is a plan view of the machine on the line 10—10, Fig. 3, Fig. 11 is a plan view of a portion of bars and adjustable support for the nail driving arms, Fig. 12 is a side elevation of the cam used for discharging the nails into the driving chucks, Fig. 13 is a development in side elevation of the cam shown in Fig. 12 to illustrate the several operations effected thereby, Fig. 14 is a plan view in section of the series of nail feeding fingers illustrating the discharge of different series of nails into the nail chucks when the different box portions are to be nailed, Fig. 15 is a view in front elevation of a portion of the bar on which the nail feeding fingers are adjustably supported, Fig. 16 is a view partly in section of the discharge end of the chute in which the nails pass down, Fig. 17 is a front elevation of one of the nail feeding escapements, and Fig. 18 is a side view of one of the nail feeding escapements.

This invention relates to that class of box making machinery which is of the semi-automatic type in which the machine is started in operation by the operator pressing upon a foot pedal, whereupon nails will be driven first in one side, then in the bottom and finally in the second side of the box, the machine itself carrying out the series of operations necessary to effect this result, the operator starting it with the foot pedal each time he changes the position of the box.

The numeral 1 represents the base of the machine, which base rests upon the floor and carries a heavy standard 2, said standard having an inclined portion 3 at its upper end with guides 4, 5 for the direction of the nail drivers and guides 6, 7 for the slidable table 8. The table 8 is supported by means of a standard 9, hand wheel 10, screw 11, roller 12 and cam 13. The screw 11 is threaded into the hand wheel 10, which hand wheel rests upon the top of the post 9 and forms the means whereby the table 8 may be moved up and down to adjust its height for different sizes of boxes.

The roller 12 is carried by the upper end of the screw 11 and the table 8 has a centrally placed yoke 14 which rests on a heavy spiral spring 15, said spring being used as a buffer to prevent the table from falling noisily. Extending longitudinally of the table is a shaft 16, said shaft having the cam 13 mounted thereon adjacent its center and two other cams 17, 18 thereon held in a fixed relation with respect to the box supporting slides 20, 21 by means of arms 22, 23, the object being to move the box supporting legs 24, 25, 26, 27 outwardly when the box side is to be put on and to allow them to be moved inwardly when the box bottom is to be nailed on. A hand wheel 20' on a right and left screw shaft 21' is used to adjust slides 20, 21.

The shaft 16 is driven from the sprocket gear 28 adjacent the cam 13, a chain 29 passing around said sprocket wheel and around a sprocket wheel 30 on a shaft 31 at the rear of the table 8. Slotted angle stops 25', 26' are used to position the boxes when on the supports 25, 26.

The shaft 31 is provided with a Geneva stop cam 32 which is operated from the pins 33, 34 on the head 35 carried by the shaft 36, the latter shaft having a bevel gear 37 in mesh with a bevel gear 38 slidable on a vertically extending shaft 39. The shaft 31 requires three movements of the pins 33, 34 in contact therewith to effect one complete revolution, the object being to first have the table 8 and slide supported thereon at the proper level to receive the box ends; second, to rotate the cams 17, 18 so that the box supports 25, 26 will support the box in such a position as to enable the bottom to be nailed thereon, after which the table will be lowered the thickness of one box side and may have the remaining side nailed thereto.

The slidable supports 20, 21 have short arms 40, 41 pivoted thereto, each arm having a roller as indicated at 42, 43 to bear upon the cams 17, 18 for the purpose of positioning the box supporting members 25, 26, when the bottom of the box is to be nailed, said arms bearing on the flanges of the supports 25, 26. The supports 25, 26 are carried by screws 44, 45, said screws passing through rigid heads 46, 47. The heads are provided with pivot pins 48, 49 on which the supports 25, 26 are pivotally mounted. The heads 46, 47 also carry depending lugs 51, 52, 53, 54, which lugs form the bearings for a shaft 55 having a feather way for the purpose of rotating the spiral gears 56, 57, a hand wheel 58 being used to turn them.

The spiral gear 56 engages a gear 59 while the gear 57 engages a similar spiral gear 60, the spiral gears 59, 60 supporting the heads 46, 47 adjustably and independently of the adjustment of the table 8 and box supports 20, 21. The heads 46, 47 are each provided with an upwardly extending plate 61, 62 having a hole therethrough through which the bolts 63, 64 are passed, said bolts being connected respectively with the supports 25, 26, spiral springs 64', 65 carried by said bolts normally drawing the box supports 25, 26 into the position shown in Fig. 8 when the cams 17, 18 will permit them to be so drawn.

The nail chucks of which there are ten as indicated at 66 to 75 inclusive are adjustably supported in arms 76, 77 carried by slidable inclined rods 78, 79, 80, 81. The rods 78 to 81 are slidable in lugs 82, 83, 84, 85 of transversely adjustable cross arms 86, 87, the said cross arms being adjustable transversely of the machine on the cross head 88, said cross head having guide plates 89, 90 bolted thereto so that it is movable up and down on the inclined guide ways 4, 5. The cross arms 86, 87 have oppositely threaded nuts 90, 91 connected therewith through which a shaft 92 having oppositely running threads extends for the adjustment of said arms, a hand wheel 93 being used to turn said shaft.

When the adjustment of the arms 86, 87 is attained bolts 94, 95 with handled nuts 96, 97 thereon are used to secure said arms in the given adjustment. The arms 86, 87 each have a groove in their underside to receive the heads 99 of the nail punches 100, said punches being loosely mounted in said arms 86, 87 so as to always assume a position over the nail chuck corresponding thereto.

Figure 5:
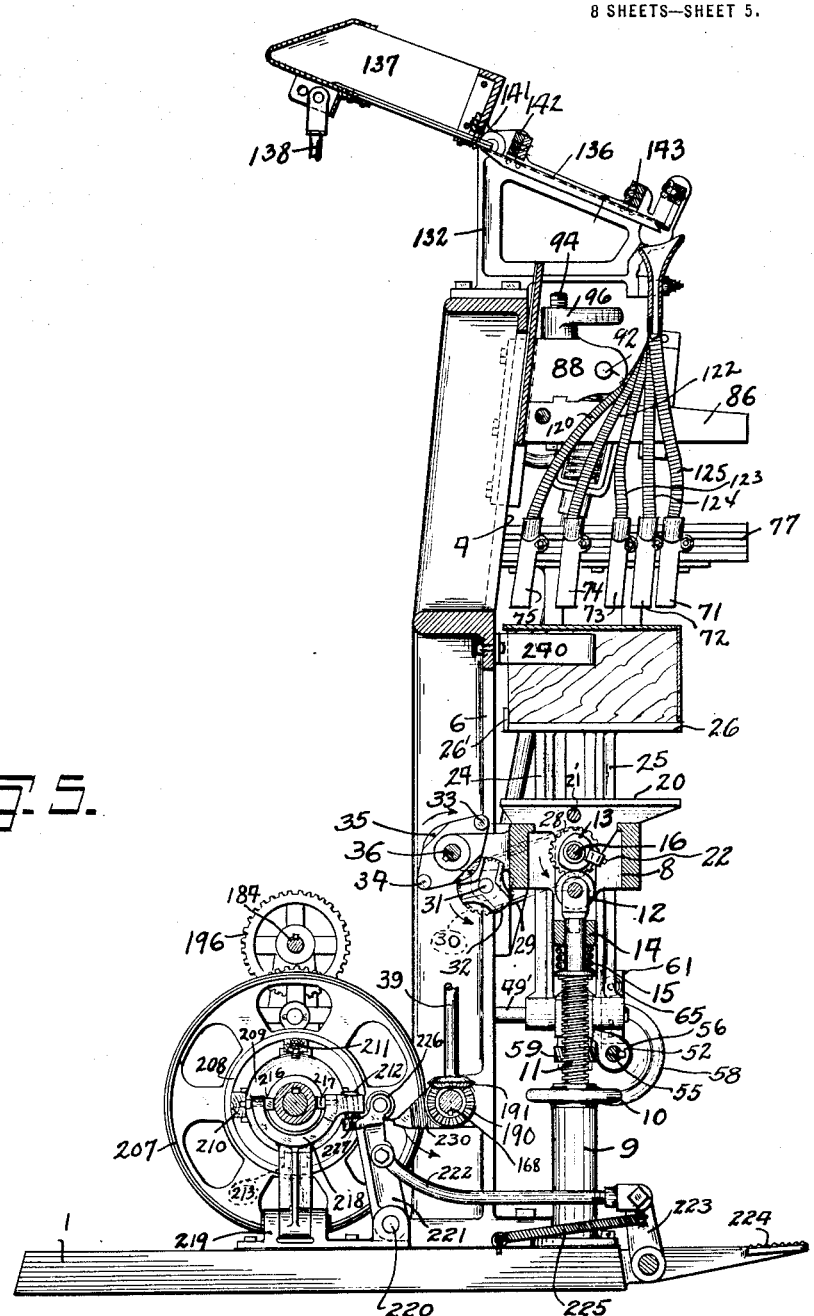
Fig. 5 is a vertical sectional view through the machine on the line 5—5, Fig. 2, Fig. 5$^A$ is a vertical sectional view through one of the nailing chucks, Fig. 5$^B$ is a view in elevation of one of the nailing chucks.

The nail chucks may be of any accepted and well known construction, although the form shown in Figs. 5^A and 5^B have been found to be suitable. In these figures it will be observed the body of the nail chuck is illustrated at 101, said chuck being provided with a lug 102 at its upper end to receive a bolt for securing the chuck to the arm supporting it and it has two springs 103, 104 for holding the nail directing parts of the chuck 105, 106 together firmly enough to cause the nail to be properly driven when struck by the driving punches. The chuck has an opening 107 at the top for its driving punch and an inclined side opening 108 into which the nail is dropped from the feed chute. The springs 103, 104 are held in position by means of two screws 109, 110.

The slidable cross head 88 has a link 111 connected therewith for the operation of the arm 112, which arm is supported on a shaft 113 carrying the cam 114, a pawl 115 operating the said cam. Extending upwardly from the nail chucks are ten spiral steel tubes 116 to 125 inclusive, said steel tubes being connected with supports 126 at their upper ends, which supports have funnels 127 into which the nails are dropped. The spiral tube supports are held in place on a cross bar 128 by means of clamps 129 and bolts 130 in pairs, there being five of said bolts and five of said clamps to secure said tube holders in place.

On the top of the machine are two angular frames 131, 132, said frames being for the support of the cross bar holding the nail tubes, the shaft 113, the nail feeding escapement bar 135, the nail guides 136 and the nail hopper 137, which latter is pivoted on the upper end of the frames 131, 132 and is raised and lowered by means of the pitman 138 to keep the nails agitated so that they will fall into slots 140 in the bottom of said hopper and be directed from said slots into the slots of the guides 136.

The hopper 137 has a narrow opening 141 at its front edge to allow the nails to escape therefrom, any suitable means being employed to work the nails into the chutes. The guides are supported by the cross bar 142 at their upper ends, said cross bar having notches in its under edge to allow the nails to feed down the guides. A cross bar 143 like the cross bar 142 supports the guides at their lower ends just back of the several escapements. The nail escapement supporting bar 135 is slidable transversely of the frame of the machine, a spring 144 holding it normally in engagement with the cam 114.

The nail escapements each comprise a head block 145 having a bolt 146 with a wing nut 147 connected therewith. On the sides of the head 145 there are springs 148, 149, 150 and 151, the springs 148 and 151 being used for the purpose of strengthening the springs 149, 150. The spring 149 has a point 152, while the spring 150 has a point 153, said points being spaced apart the width of one nail in the guide ways. The escapements are longitudinally adjustable on the bar 135 because of the elongated slots therein through which the bolts 146 pass. The object of said adjustment is to provide means whereby the nails may be discharged to the particular nail chucks requiring them, the cam 114, a development of which is shown in Fig. 13 shifting the bar 135 to discharge the nails. If Figs. 13 and 14 are examined it will be seen that there is a complete duplication of the several high and low places of said cam 114. Remembering that three nails are to be delivered on the next operation it will be seen that the two outer nails $x$ and $y$ are too far back to be dropped when the bar moves over A, and they will not be dropped when it moves over C. However when the bar passes over E all the nails will be dropped, four for each end of the bottom. The cam 114 feeds the nails in two complete cycles during each revolution thereof.

The ratchet cam 114 is provided with a plurality of high and low places A to F in two series and as the machine is now set for nailing on the bottom, four nails for each end of the bottom have just been dropped into the chucks by the last operation and the escapement bar has moved back through its greatest throw to catch all of the nails except for the two chucks 67, 72 not used in the making of the box illustrated. As the cam moves past the bar 135 in the direction of the arrow Fig. 13, it pushes the escapement bar, first up on to the elevation A, whereupon three nails are dropped into the chucks for nailing on the last remaining side. Immediately after the high place A passes the bar 135 the low place B comes into position adjacent the bar and all of the escapements receive a nail and when the two new box ends have been put on the table and the machine started the cam C passes over the end of the bar 135 and drops three more nails for each end. After the high place C passes the bar 135 the low place D comes into position against the same and a fresh supply of nails are caught up by the several escapements. following which the high place E passes the bar 135 and deposits four nails in the chucks at each end of the box, after which the cam moves so that the low place F comes against the bar 135 and the operation is repeated.

It will be observed that the slides 4 and 5 and bars 78 to 81 inclusive, as well as the chucks, are inclined to the vertical, the object being to drive the nails at an angle slightly out of the vertical in order to prevent splitting the box material, as well as to strengthen the box.

The head 88 is provided with a pin at each end as indicated at 160, 161, said pins being pivotally connected with shackles 162, 163. The shackles 162, 163 are held in their respective pins by means of suitable washers and cotter pins and the rods 164, 165 extend into said shackles at the lower ends thereof and are connected thereto by means of suitable heavy springs 166, 167, said springs being stiff enough to withstand the thrust of the nailing pressure of the entire series of nail drivers.

In the base of the machine there is a shaft 168 carrying a spur gear 169 on one end thereof and a crank 170 at the other end thereof, said spur gear and said crank being connected respectively with journal boxes 171, 172 on the lower ends of the rods 164, and 165. At the back of the main frame of the machine there are secondary frames 180, 181, said frames supporting shafts 182, 183, 184, 185. The shaft 182 has a gear 186 in mesh with the gear 169 and both of said gears are covered with a guard 187. The shaft 168 is also provided with a bevel gear 190, which bevel gear is in mesh with a bevel gear 191 on the lower end of the feather shaft 39, which has been previously referred to, a bracket 192 forming a journal bearing for the lower end of said shaft 39.

The shaft 182 also carries a gear 193, which gear is in mesh with a gear 194 on the shaft 183, said shaft having a smaller gear 195 connected therewith and in mesh with a larger gear 196 on the shaft 184. The shaft 184 carries a small gear 197 in mesh with a larger gear 198 on the shaft 185, the latter gear being for the purpose of raising and lowering the nail hopper slowly to work the nails in the hopper into the receiving chutes where they are suspended by their heads.

The shaft 182 has a wheel 199 mounted thereon, which wheel is used for the purpose of stopping the machine, a brake arm 200 being pivoted on the lower portion of the frame at 201 and having a stop at 202 connected therewith to prevent the brake from moving away from the brake wheel 199 more than fixed amount. At the upper end the brake has a lever 203 which is resiliently held in connection with the brake arm by means of the bolt 204 and spring 205, a roller 206 carried by said arm bearing upon the top of the crank so that when the machine has effected one nailing operation and the crank 170 has turned over once, it will throw the brake into contact with the wheel 199 and will stop the machine.

The machine is driven from a belt pulley 207 on the shaft 182. The pulley 207 has a flange 208, the interior surface of which is used for the purpose of driving the slidable clutch member 209. The slidable clutch member is movable on a key on the shaft 182 in a well known manner and has shoes 210, 211, 212 and 213 in contact with the flange 208. The slidable clutch member is also provided with a groove 214 to receive pins 216, 217 of the clutch shifting lever 218, said lever being pivoted in a bearing block 219 on the base of the machine. The bearing block 219 also has a pivot pin 220 for the lever 221, said lever having a link 222 to connect it with the bell crank lever 223 pivoted at the front of the machine where the foot pedal can be used by the operator. A coil spring 225 is used to hold the lever normally in the position indicated in Fig. 5.

At the top of the lever 221 it is provided with two rollers 226, 227, the roller 227 bearing upon an arm 228 of the clutch shifting lever to disengage the clutch from the flange 208, while the roller 226 is so positioned that a cam 230 on the shaft 168 will strike said roller and push the roller 227 against the clutch shifting lever when one revolution of the machine has been passed through, and at the same time the cam 230 moves far enough to allow the operator to pull the lever 221 back so that the spring 231 will violently throw the clutch shoes into engagement with the flange 208 to start the machine.

In order to enable the workman to properly position his box ends when the nailing is to be effected the chuck supporting member 76 carries a depending arm 233 while the chuck supporting member 77 carries a straight depending arm 234. The arm 233 has an offset portion 235 which bears on the box end while the arm 234 has a plate 236 connected therewith by means of two bolts 237 and held in a fixed position by means of a stiff spring 238. The back frame of the machine carries two flat steel springs 239, 240, said frame being slotted for the proper adjustment thereof.

The operation of the machine is as follows: When given box shooks are to be nailed up into boxes, the workman first sets the table 8 at the proper height so that the nail drivers will properly set the nails in the first box side, the box ends being placed in position between the springs 239, 240 and their abutments; next the workman sets the pivoted supports 25, 26 so that the nail drivers will properly set the nails when driven in the bottom and ends of the box, and it will be observed that in order to prevent the driving operations from twisting the table 8 when using the supports 25, 26 that the pins 48' and 49' are long enough so that they bear on the back of the frame of the machine, thereby preventing the pressure on the supports 25, 26 from twisting the table 8 or the said supports. When the box supports are properly positioned as to elevation and distance apart, the workman places two box ends between the springs 239, 240 and their abutments and places a box side on the top of the box ends, whereupon he starts the machine by stepping on the pedal 224. This releases the clutch with a bang and the machine begins its cycle of operations.

Figure 1:
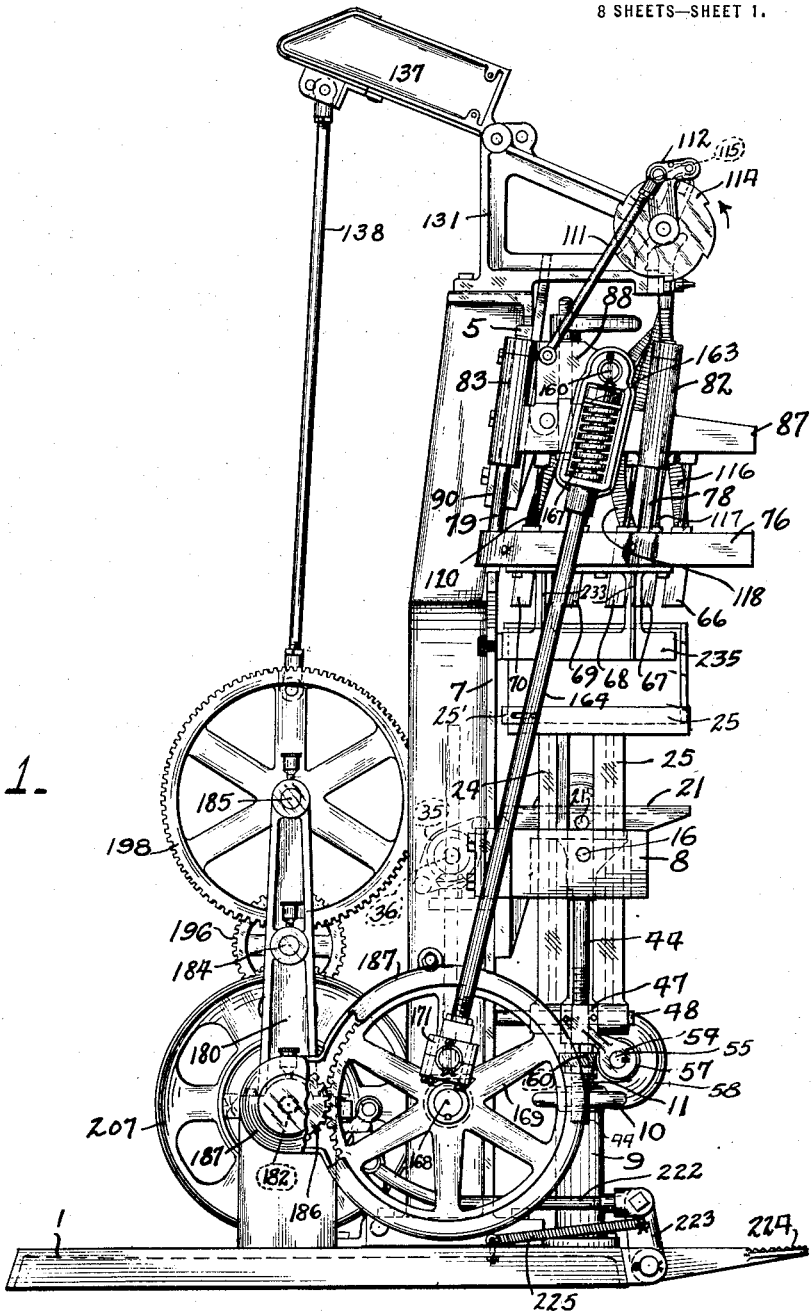
Figure 1 is a side elevation of the machine looking from the left of Fig. 2.
Figure 2:
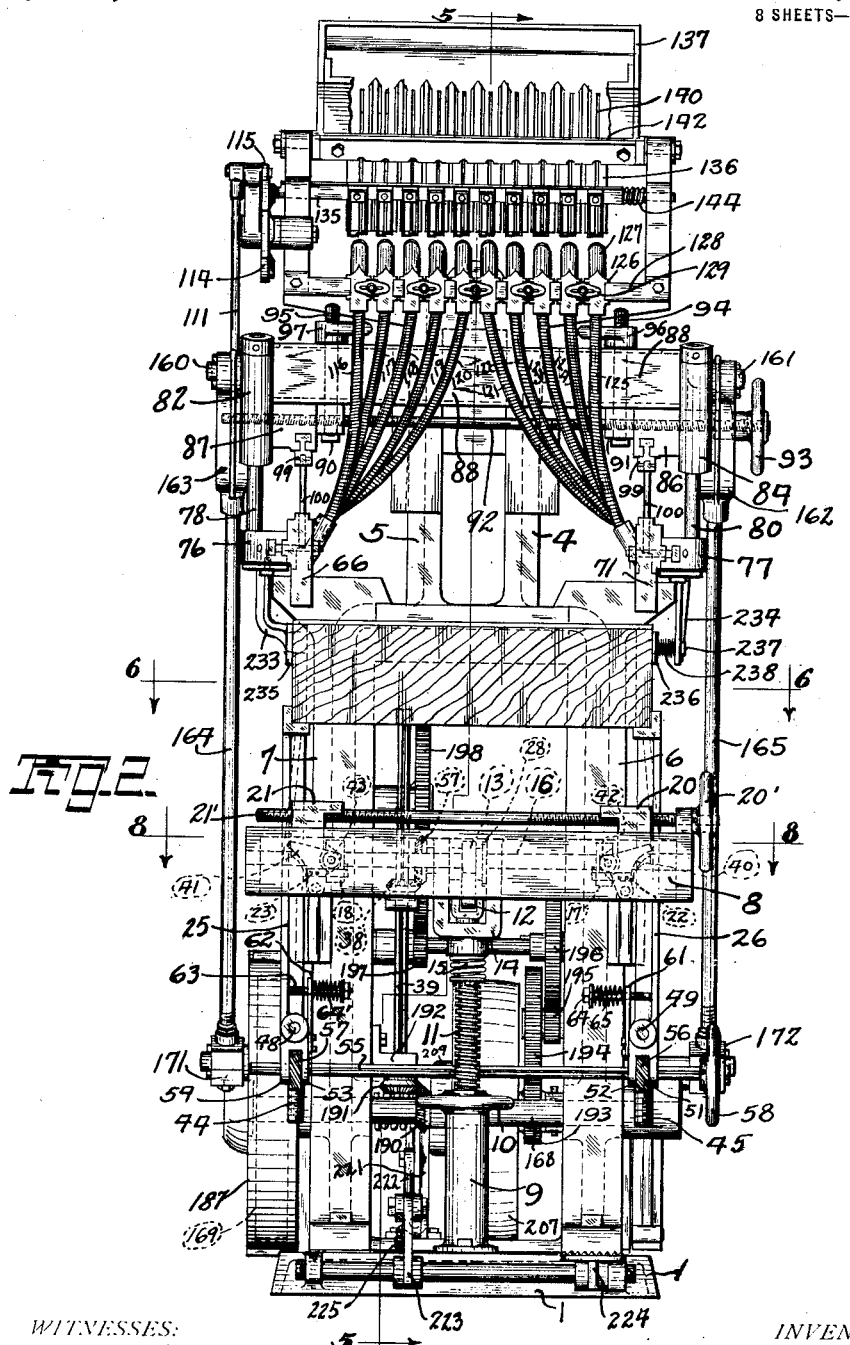
Fig. 2 is a front elevation of the machine.

The engagement of the clutch starts the gear 169 and draws the head 88 downwardly. When the chucks touch the box they stop and the driver arms 86, 87 continue to move until the nail has been driven into the box and set. At the same time the cam wheel 114 has been rotated and a fresh supply of nails dropped into the chutes. As soon as one nailing operation is completed the crank 170 raises the lever 203 and the brake stops the machine. The workman then turns the box so that the box ends are positioned as shown in Fig. 2, the cams 40, 41 having in the meantime allowed the supports 25, 26 to move inwardly. The workman then starts the machine again with the foot lever and the nails for the bottom are driven thereinto. As soon as the bottom nails have been driven the cam 13 will have so turned that the table 8 is lowered the thickness of one box side, whereupon the box is turned 90 degrees and placed on the supports 20, 21 again and the remaining side is nailed thereto, the supports 25, 26 having been pushed back out of the way.

It will, of course, be understood that in carrying out the cycle of operations that the cam 114 by reason of the varying heights of the elevation thereon dispenses three nails twice and four nails once for the completion of each box, two of the chucks shown in the drawing not being in use at any time. During the time the machine is running the nail hopper 137 is slowly rising and falling in order to shake up the nails and keep a continuous supply in the nail chutes 136.

It is to be observed that the links which drive the head 88 are coupled thereto at some distance from the slides 4, 5, the object being to bring the center of the thrust as nearly as possible over the center of resistance offered by the several nail drivers, and it will also be seen that the nail chucks are slightly inclined so that they lie almost parallel to the position of the links 164, 165 at the beginning of the stroke thereon, said inclination of said nail chucks being for the purpose of driving the nails slightly across the grain of the wood of the box, thereby making the nails hold better, as well as slightly changing the direction so that the direction of thrust is more nearly in line with the driving links 164, 165.

Having thus described my invention what I claim as new and desire to secure by Letters Patent of the United States, is as follows, modifications within the scope of the claims being expressly reserved:

1. A box nailing machine comprising a frame, a vertically adjustable table, box supports carried by said table and adjustable across the same, pivoted box supports adjustable toward and away from the first mentioned box supports, means to move the latter box supports over and away from the first mentioned box supports, and means to lower said table the thickness of one box side after two of the nailing operations have been completed.

2. A nailing machine comprising a frame, a vertically adjustable table carried thereby, a slidable head provided with nail chucks and nail drivers, a secondary work support, means to raise and lower said support, and means to bring said secondary support over the vertically adjustable table after the first driving operation on said table.

3. A box nailing machine comprising a frame, a vertically adjustable table carried thereby, a vertically adjustable secondary work support, a slidable head, nail chucks and nail drivers supported from said head, means to feed the nails to the nail chucks in three different series, and means to move the secondary support over the vertically adjustable table after the first nailing operation on said table.

4. In a nailing machine, a frame, a vertically adjustable table carried thereby, a secondary work support pivotally and adjustably mounted on the frame, a slidable head, nail chucks and nail drivers supported from said slidable head, means to feed the nails to the nail chucks in three series, means to lower the adjustable table the thickness of one box side after one nailing operation thereon, and means to bring the secondary support over said table after the first nailing operation on the table.

5. A box nailing machine comprising a frame, a vertically adjustable table slidable therein, automatic means to shift said table to two levels, a slidable nail driver head, nail drivers carried thereby, a series of nail chucks, pivoted work holding arms adapted to hold a box at any desired level with respect to the adjustable table, means to feed the nails to the chucks in three separate series, and means to reciprocate the driver head to drive the nails.

6. A box nailing machine comprising a frame, a box support carried thereby, means to effect the nailing of a box when placed on said support, means to change the elevation of the box support when one of the nailing operations has been carried out thereon and pivotally mounted auxiliary supports movable over the first mentioned support for supporting the box during the nailing of the bottom.

7. A box nailing machine comprising a frame, a box support carried thereby, means to effect the nailing of a box when placed on said support, a secondary support on which the nailing of another portion of the box is effected, and means to change automatically the elevation of the first support after two of the nailing operations have been carried out thereon and on the secondary support.

8. A box nailing machine comprising a frame, a box support carried thereby, means to effect the nailing of a box when placed thereon, a secondary adjustable work support, means to move said secondary support into and out of an operative position, and means to lower the first support after two of the nailing operations have been completed.

9. A nailing machine comprising the combination of a frame, an adjustable box support, means to move said support vertically from one position of adjustment to another position, a secondary box support pivotally supported on the frame, means to move the secondary box support over the first support after each two nailing operations on the first support, and means to drive two sets of nails over one support and a different set of nails over the other support in each series of three operations of the machine.

In testimony whereof I have hereunto set my hand this 18th day of May, A. D. 1915, in the presence of the two subscribed witnesses.

ELMER C. NORTHRUP.

Witnesses:
C. P. GRIFFIN,
L. H. ANDERSON.